United States Patent Office 3,080,213
Patented Mar. 5, 1963

3,080,213
METHOD FOR PRODUCING SYNTHETIC CRYOLITE
Fredrick Earl Adkins, Jr., Benton, Ark., assignor to Reynolds Metals Company, Richmond, Va., a corporation of Delaware
No Drawing. Filed Jan. 24, 1961, Ser. No. 84,507
10 Claims. (Cl. 23—88)

This invention relates to a novel process for the conversion of alkali metal fluosilicates to double fluorides of the alkali metal and aluminum. More particularly, the invention concerns a process for the conversion of sodium fluosilicate to form synthetic cryolite which contains a substantial proportion of silica.

In the electrolytic reduction process for the manufacture of aluminum metal, the electrolyte comprises alumina dissolved in molten cryolite. For the production of standard grade aluminum, having a relatively low silicon content, a low-silica cryolite is required. A synthetic cryolite suitable for that purpose is conventionally prepared by the reaction of sodium aluminate solution and hydrofluoric acid. In addition, the silica limitation necessitates the use of low-silica fluorspar as the source of additional fluorine, and the latter ore is costly due to its scarcity in the United States.

There has recently been an increasing demand, however, for aluminum-silicon alloys; and an object of this invention has been to devise a convenient and economical process for the production of synthetic cryolite containing a substantial proportion of silica.

In accordance with the invention, a direct and inexpensive process has been found for the conversion of an alkali metal fluosilicate to a double salt of the alkali metal and aluminum. This double salt retains substantially all of the silica value of the fluosilicate and can be utilized directly in the manufacture of aluminum metal having a high silicon content. The necessary silicon is supplied substantially by conversion of silica into silicon metal within the electrolytic cell. Thus the invention renders possible the conversion of alkali metal fluosilicate, and especially the sodium fluosilicate by-product of the rock phosphate industry, into a silica-containing cryolite for the aluminum industry, thereby effectively utilizing the fluorine, alkali metal, and silica values.

The invention has the further advantage of permitting the use of high-silica domestic fluorspar ores, even as the fluorine source for making conventional low-silica cryolite. The silica distilled over with hydrofluoric acid (in the treatment of silica-containing fluorspar) may be removed in the well-known manner by addition of caustic soda or common salt to the acid solution, thereby precipitating sodium fluosilicate. This process was not previously feasible commercially because, for every part by weight of silica, 1.9 parts by weight of fluorine were contained in the precipitate and the latter could not be treated economically to recover the fluorine. By developing a novel and unique process for directly and economically converting the sodium fluosilicate into cryolite which contains silica, the invention has solved a dual need of the art.

It is significant, furthermore, that the potential use of sodium fluosilicate to provide part of the silicon and sodium fluoride requirements for producing aluminum-silicon alloy has been previously recognized. But sodium fluosilicate decomposes at a temperature lower than the reduction cell temperature, with consequent loss of fluorine and silicon as silicon tetrafluoride. By first converting the sodium fluosilicate into the thermally stable synthetic high-silica cryolite, in accordance with the invention, the silicon and fluorine values may be fully utilized.

It was found, in accordance with the invention, that a double fluoride of an alkali metal and aluminum, containing a substantial proportion of silica, can be obtained by heating a mixture of an alkali metal fluosilicate, alumina trihydrate, and an alkali metal hydroxide, in the solid phase, at an elevated temperature. The reaction is illustrated by the following equation, in which the alkali metal is sodium, but it is a general reaction and the equation is to be regarded as illustrative, and not as limiting:

$$2Na_2SiF_6 + OH + Al_2O_3 \cdot 3H_2O = 2Na_3AlF_6 + 2SiO_2 + 4H_2O \quad (1)$$

The silica formed in the reaction remains in admixture with the cryolite. The proportions of the reactants are preferably stoichiometrical, but it will be understood that considerable latitude is possible in this regard and that precisely molar quantities need not be employed.

The temperature of heating will depend upon the character of the reactants, but is advantageously between about 400° C. and about 950° C., and preferably about 600° C.

The reaction may be carried out using any alkali metal fluosilicate as a starting material, including sodium, potassium, caesium, rubidium and lithium fluosilicates. However, ordinarily the starting material will be sodium fluosilicate, a considerable amount of which is available as by-product sodium fluosilicate.

Advantageously the process of this invention may employ by-product sodium fluosilicate, which is available as a by-product of the phosphate fertilizer industry where it is formed in the defluorination operations by absorption of gaseous fluorine compounds (such as fluosilicic acid) in caustic soda solution. It is also a by-product of the desilication of hydrofluoric acid in which hydrofluoric acid contaminated with silica is purified by treatment with caustic soda.

The alkali metal hydroxide reactant may be sodium, potassium, or other alkali metal hydroxide, but sodium hydroxide is preferred, particularly where synthetic cryolite is being prepared.

There is described in U.S. Patent 1,015,220 a wet process for the preparation of cryolite by reacting sodium fluosilicate with alumina and with sodium carbonate by heating the reactants in water at 100° C. and in an extremely finely divided state. The patent suggests that conversion with sodium carbonate would not take place even at incandescent temperatures in the dry state, hence the use of aqueous solutions.

In accordance with the present invention, employing an alkali metal hydroxide, and carrying out the reaction in the dry state, complete conversion is obtained to cryolite at moderate heating temperatures. Moreover, it is not necessary that the reactants be in a state of extreme comminution, but they may be employed in mesh sizes between about 150 and about 325 mesh. The use of sodium hydroxide, in accordance with the invention, is believed to facilitate the reaction by rapidly attacking the alumina crystals, which would not be the case with sodium carbonate, at the temperatures employed.

The cryolite produced by the process of this invention will generally contain from about 20% to about 28% of silica, and ordinarily about 23% silica. The reaction may be carried out in steel equipment with no appreciable contamination of the product by iron, only about 0.01% to 0.03% of iron being found in the product. The process permits an exceptionally high fluorine recovery, in the order of 99.5%.

The process is generally carried out by employing sodium fluosilicate of suitable mesh size (for example, predominantly +325 mesh); caustic soda in the form of commercially available ground flake grade; and alumina trihydrate in the form of a granular solid, or Bayer process filter cake (85% $Al_2O_3 \cdot 3H_2O$), having a particle size less than about 65 mesh.

The reactants are mixed in stoichiometric proportions and preferably subjected to preliminary drying at 100°–200° C.

The time of heating the reactants is subject to considerable variation depending upon their nature, but in general a heating time of about 60 minutes, at atmospheric pressure, is preferred. The cryolite formed may be ground to any desired particle size after removal from the apparatus.

The novel process of this invention is illustrated by the following examples, which are not, however, to be regarded as limiting.

EXAMPLE 1

A mixture of 22.4 g. of $Na_2SiF_6$ of +325 mesh size, 9.3 g. of $Al_2O_3 \cdot 3H_2O$ analyzing 80% above 200 mesh and 20% less than 200 mesh size, and 9.92 g. of 48% NaOH were placed in an iron crucible and 10 g. water were added to aid in mixing. The ingredients were mixed thoroughly to a pasty consistency. The crucible was then fired in an electric furnace at 100–150° C. for 15 minutes to drive off water. The furnace temperature was then rapidly increased to 600° C. and held at that temperature for 60 minutes. The crucible was cooled and the solid product, totaling 32.1 g. was removed. It gave the following analysis:

X-ray analysis:
    Cryolite $Na_3AlF_6$ _____ Predominant.
    Chiolite $Na_5Al_3F_{14}$ _____ Trace.
    NaF _____ Present.
    Gmelinite
        $Na_2O \cdot Al_2O_3 \cdot 4SiO_2 \cdot 6H_2O$ _____ Possibly present.

Chemical analysis:
| | Percent |
|---|---|
| F | 42.12 |
| Na | 25.42 |
| Al | 9.79 |
| $SiO_2$ | 22.95 |
| $Fe_2O_3$ | 0.001 |
| LOI | 0.53 |

The product showed very little pick-up of iron.

EXAMPLE 2

Effect of Temperature on Conversion to Cryolite

In order to determine the extent of conversion of sodium fluosilicate, alumina trihydrate and sodium hydroxide mixtures to cryolite at various reaction temperatures, the mixture prepared as described in Example 1, after drying, was divided into six samples which were heated for 60 minutes at individual temperatures ranging from 100° C. to 600° C., as shown in the following table. The chemical components of the reaction products appear in the first column. The conversion to cryolite was determined by means of X-ray diffraction. The silica was not present in crystalline form since it was largely undetected by X-ray. The table shows that for the production of cryolite in maximum yield and with a high proportion of silica content, the temperature should be at least about 400° C. and for subsequent electrolytic cell use, preferably at least about 600° C.

TABLE I

Effect of temperature on the conversion of $Na_2SiF_6$, $Al_2O_3 \cdot 3H_2O$ and NaOH to cryolite

| Temperature of test, °C | 100 | 200 | 300 | 400 | 500 | 600 |
|---|---|---|---|---|---|---|
| $Na_3AlF_6$ | Trace | 15–25% | 40–60% | Predom | Predom | Predom. |
| $Na_5Al_3F_{14}$ | (1) | ND | ND | 5–10% | 5–10% | Trace. |
| NaF | (1) | 15–30% | Pres | 5–15% | 5–15% | Pres. |
| $Al_2O_3 \cdot 3H_2O$ | (1) | 15–30% | ND | ND | ND | ND. |
| $Al_2O_3 \cdot H_2O$ | (1) | ND | ND | ND | ND | ND. |
| $Na_2SiF_6$ | (1) | 10–20% | ND | ND | ND | ND. |
| Quartz | (1) | ND | 3–5% | 3–5% | ND | ND. |
| Gmelinite | (1) | ND | ND | ND | ND | Possibly Present. |

[1] Analysis discontinued since sample was not dry after the treatment was given.
Predom.—Predominant.
Pres.—Present.
ND—None Detected.

EXAMPLE 3

A mixture of 21.4 g. $K_2SiF_6$ (80% $K_2SiF_6$, 14.5% $KF \cdot 4HF$, and 5.5% $H_2O$), 7.54 g. $Al_2O_3 \cdot 3H_2O$ (similar to that of Example 1), and 13.2 g. 48% KOH was placed in an iron crucible and 1.4 g. $H_2O$ were added to aid in mixing. The mixture was stirred to a pasty consistency. The mixture was then dried at 130° C. for 15 minutes followed by firing at 600° C. in an electric furnace for 60 minutes. The crucible was removed and 31.4 g. solid product were obtained. The residue had the following analysis:

X-ray analysis:
    Potassium Cryolite $K_3AlF_6$ _____ Present.
    No other phases detected (since the $SiO_2$ present is amorphous).

Chemical analysis:
| | Percent |
|---|---|
| F | 33.87 |
| K | 35.39 |
| Al | 8.13 |
| $SiO_2$ | 14.36 |

Calculated analysis:
| | |
|---|---|
| $K_3AlF_6$ | 75.6 |
| KF | 1.6 |
| $Al_2O_3$ | 0.4 |
| $SiO_2$ | 14.4 |

What is claimed is:

1. Process for the manufacture of a double fluoride of alkali metal and aluminum, which comprises heating a mixture of an alkali metal fluosilicate, alumina hydrate, and an alkali metal hydroxide, in the solid phase at a temperature between about 400° C. and about 950° C., to form said double fluoride.

2. Process for the manufacture of a double fluoride of alkali metal and aluminum, said double fluoride containing a substantial amount of silica, which comprises heating a mixture of an alkali metal fluosilicate, alumina hydrate, and an alkali metal hydroxide, in approximately stoichiometric proportions, in the solid phase at a temperature of about 600° C., to form said double fluoride.

3. Process for the conversion of sodium fluosilicate to sodium cryolite which comprises heating a mixture of sodium fluosilicate, alumina hydrate, and sodium hydroxide, in the solid phase at a temperature between about 400° C., and about 950° C. to form sodium cryolite and silica.

4. Process for the conversion of sodium fluosilicate to sodium cryolite which contains a substantial proportion of silica, which comprises heating together sodium fluosilicate, alumina trihydrate, and sodium hydroxide, in the solid phase at a temperature of about 600° C., to form said sodium cryolite.

5. The process of claim 4 in which the reactants are heated for a period of about 60 minutes.

6. The process of claim 4 in which the alumina trihydrate is Bayer process filter cake consisting essentially of 85% $Al_2O_3.3H_2O$.

7. The process of claim 1 in which the reactants are of a particle size between about 150 and about 325 mesh.

8. Process for the manufacture of a double fluoride of sodium and aluminum, which comprises heating a mixture of sodium fluosilicate, alumina trihydrate, and sodium hydroxide, in the solid phase at a temperature between about 400° C. and about 950° C., to form said double fluoride.

9. The process of claim 8 in which the sodium fluosilicate is a by-product of the defluorination of phosphate minerals.

10. The process of claim 8 in which the sodium fluosilicate is a by-product obtained in the desilication of hydrofluoric acid.

References Cited in the file of this patent

UNITED STATES PATENTS

| | | |
|---|---|---|
| 1,015,220 | Teisler | Jan. 16, 1912 |
| 2,058,075 | Gaither | Oct. 20, 1936 |
| 2,305,921 | Eringer | Dec. 22, 1942 |
| 2,447,359 | Oakley | Aug. 17, 1948 |
| 2,790,705 | Kean et al. | Apr. 30, 1957 |

FOREIGN PATENTS

| | | |
|---|---|---|
| 760,136 | Great Britain | Oct. 31, 1956 |
| 541,609 | Canada | May 28, 1957 |

UNITED STATES PATENT OFFICE
CERTIFICATE OF CORRECTION

Patent No. 3,080,213          March 5, 1963

Fredrick Earl Adkins, Jr.

It is hereby certified that error appears in the above numbered patent requiring correction and that the said Letters Patent should read as corrected below.

Column 2, lines 11 and 12, the equation should appear as shown below instead of as in the patent:

$$2Na_2SiF_6 + 2NaOH + Al_2O_3 \cdot 3H_2O = 2Na_3AlF_6 + 2SiO_2 + 4H_2O$$

Signed and sealed this 8th day of October 1963.

(SEAL)
Attest:

ERNEST W. SWIDER
Attesting Officer

EDWIN L. REYNOLDS
Acting Commissioner of Patents